United States Patent
Godo et al.

(10) Patent No.: US 6,922,002 B2
(45) Date of Patent: Jul. 26, 2005

(54) MOTOR

(75) Inventors: Shinichiro Godo, Nagano (JP); Hiroaki Komatsu, Maruko-machi (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 0 days.

(21) Appl. No.: 10/743,912

(22) Filed: Dec. 24, 2003

(65) Prior Publication Data

US 2004/0150286 A1 Aug. 5, 2004

(30) Foreign Application Priority Data

Dec. 26, 2002 (JP) .................................... 2002-375698

(51) Int. Cl.$^7$ .......................... H02K 21/00; H02K 1/00
(52) U.S. Cl. .................. 310/216; 310/218; 310/67 R; 310/254
(58) Field of Search ................. 310/67 R, 51, 310/216, 217, 218, 254; 360/99.04, 99.08, 99.01, 99.07

(56) References Cited

U.S. PATENT DOCUMENTS

| | | | | |
|---|---|---|---|---|
| 5,604,389 A | * | 2/1997 | Nitta et al. | 310/67 R |
| 5,668,427 A | * | 9/1997 | Morita | 310/216 |
| 6,384,505 B1 | * | 5/2002 | Horng et al. | 310/186 |
| 6,661,150 B2 | * | 12/2003 | Utsumi | 310/254 |

FOREIGN PATENT DOCUMENTS

JP 11-032466 A 2/1999

* cited by examiner

*Primary Examiner*—Tran Nguyen
*Assistant Examiner*—Leda Pham
(74) *Attorney, Agent, or Firm*—Birch, Stewart, Kolasch & Birch, LLP

(57) ABSTRACT

The compact motor is capable of improving characteristics of torque. In the motor, a stator core includes a main core and a sub-core. The main core is constituted by piling a plurality of first core plates, which respectively have first extended pole sections of the same number. The sub-core is provided on the base plate side of the main core and is constituted by at least one second score plate, which has second extended pole sections whose number is less than that of the first extended pole sections of each of the first core plates.

2 Claims, 2 Drawing Sheets

FIG.1A  FIG.1B  FIG.1C
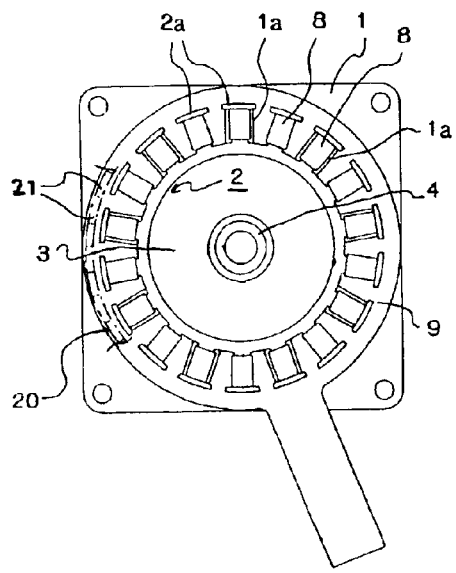
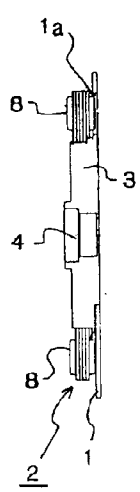
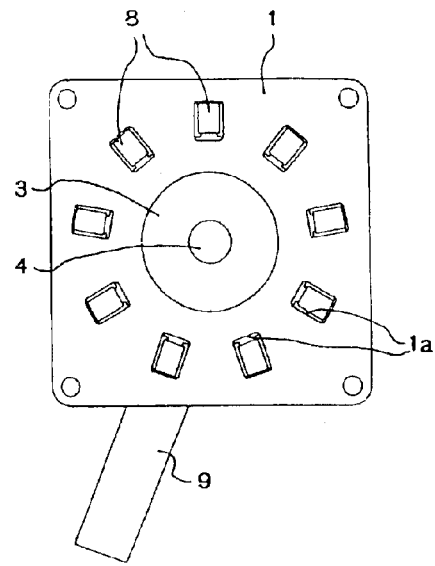
FIG.2A  FIG.2B
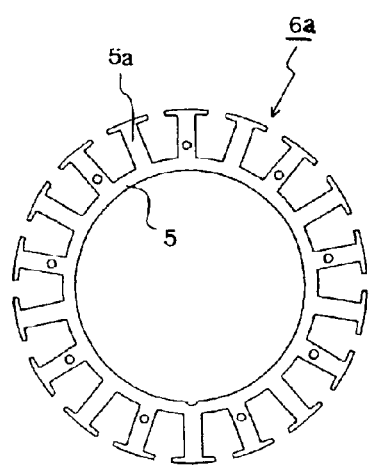
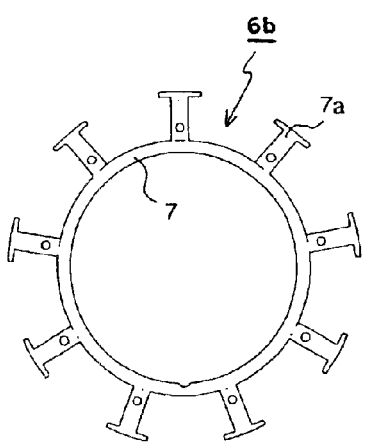

MOTOR

This Nonprovisional application claims priority under 35 U.S.C. § 119(a) on Patent Application No(s). 2002-375698 filed in Japan on Dec. 26, 2002, the entire contents of which are hereby incorporated by reference.

BACKGROUND OF THE INVENTION

The present invention relates to a motor comprising: a stator constituted by a base plate, a circuit board and a stator core having magnetic poles radially outwardly extended therefrom; and an outer rotor, which is rotatably provided to the base plate and which has rotor magnets facing the stator magnetic poles.

Motors have been used for rotating recording media, e.g., flexible disks, optical disks, cassette tapes. Motors having outer rotors are preferably used for rotating recording media because they can stably rotate at fixed speed. For example, a motor having an outer rotor is disclosed in Japanese Patent Gazette No. 11-32466. In the motor, a stator core is provided on one face of a base plate, and a flexible circuit board is adhered on the other face. The outer rotor is rotatably provided to the base plate with a bearing member. The stator core has a plurality of tooth sections, which are radially outwardly extended and on which coils are winded so as to form stator magnetic poles. The outer rotor has rotor magnets, which face the stator magnetic poles. To make the motor small, the base plate has opening sections (accommodating sections), which correspond to the tooth sections of the stator core. Each of the coils is partially accommodated in the opening section, so that the motor can be thinner.

However, in the small motor, capacity of a driving circuit is limited, and temperature must be restricted. Further, motor characteristics, especially characteristics of torque must be improved. To improve characteristics of torque, the stator core including the tooth sections must be thicker, so that diameters of the coils must be greater. Therefore, sizes of the opening sections of the base plate must be greater, too. If the sizes of the opening sections are made greater, the base plate must be weak. Further, area of the flexible circuit board, which is adhered on the base plate, must be small, so that it must be difficult to wire and mount parts, e.g., Hall element, in such small spaces.

SUMMARY OF THE INVENTION

The present invention was invented to solve the problems of the conventional motor. An object of the present invention is to provide a compact motor capable of improving characteristics of torque.

To achieve the object, the motor of the present invention has following structure.

Namely, the motor comprises: a stator including a base plate, a circuit board provided on the base plate, and a ring-shaped stator core provided on the same and having stator magnetic poles, which are radially outwardly extended from the stator core and on which coils are respectively formed; and an outer rotor being rotatably provided on the base plate and having rotor magnets, which face the stator magnetic poles, wherein the stator core comprises a main core and a sub-core, the main core is constituted by piling a plurality of first core plates, which respectively have first extended pole sections of the same number, and the sub-core is provided on the base plate side of the main core and constituted by at least one second core plate, which has second extended pole sections whose number is less than that of the first extended pole sections of each of the first core plates.

In the motor, the base plate may have a plurality of through-holes for ventilation, the through-holes may be arranged in the circumferential direction with regular separations, and the second extended pole sections of the second core plate may correspond to the through-holes.

In the motor, the second extended pole sections of the second core plate may be symmetrically arranged with respect to a center line passing one of the stator magnetic poles of the stator core.

In the motor of the present invention, the sub-core constituted by the second core plate, whose number of the second extended pole sections is less than that of the first extended pole sections, is provided on the base plate side of the main core. Therefore, thickness of the stator magnetic poles can be selectively made thicker by adjusting number of the second extended pole sections and number of the second core plates. Many magnetic fluxes pass through the selected thick magnetic pole sections, and they work to the rotor magnets from front end faces of the thick magnetic pole sections, so that forces of withdrawing and repulsing the outer rotor can be greater. Namely, characteristics of torque can be improved.

By forming the through-holes for ventilation in the circumferential direction with regular separations, strength of the base plate can be maintained. Further, the circuit board, e.g., flexible circuit board, which is provided to the base plate, can have enough spaces for wiring and mounting parts.

Especially, if the second extended pole sections of the second core plate corresponds to the through-holes only, thickness of the coils or the stator core can be absorbed in the thorough-holes, so that the thin motor having the thick stator magnetic poles can be realized without an interference between the coils and the base plate. By the thick stator magnetic poles, characteristics of torque can be improved. Further, efficiency of the motor can be improved.

If the second extended pole sections of the second core plate are symmetrically arranged with respect to the center line passing one of the stator magnetic poles of the stator core, weight and magnetic poles of the stator can be well balanced.

BRIEF DESCRIPTION OF THE DRAWINGS

Embodiments of the present invention will now be described by way of examples and with reference to the accompanying drawings, in which:

FIG. 1A is a plan view of a motor of an embodiment of the present invention;

FIG. 1B is a side view thereof;

FIG. 1C is a rear view thereof;

FIG. 2A is a plan view of a main core;

FIG. 2B is a plan view of a sub-core; and

DETAILED DESCRIPTION OF THE EMBODIMENTS

Figure 3:
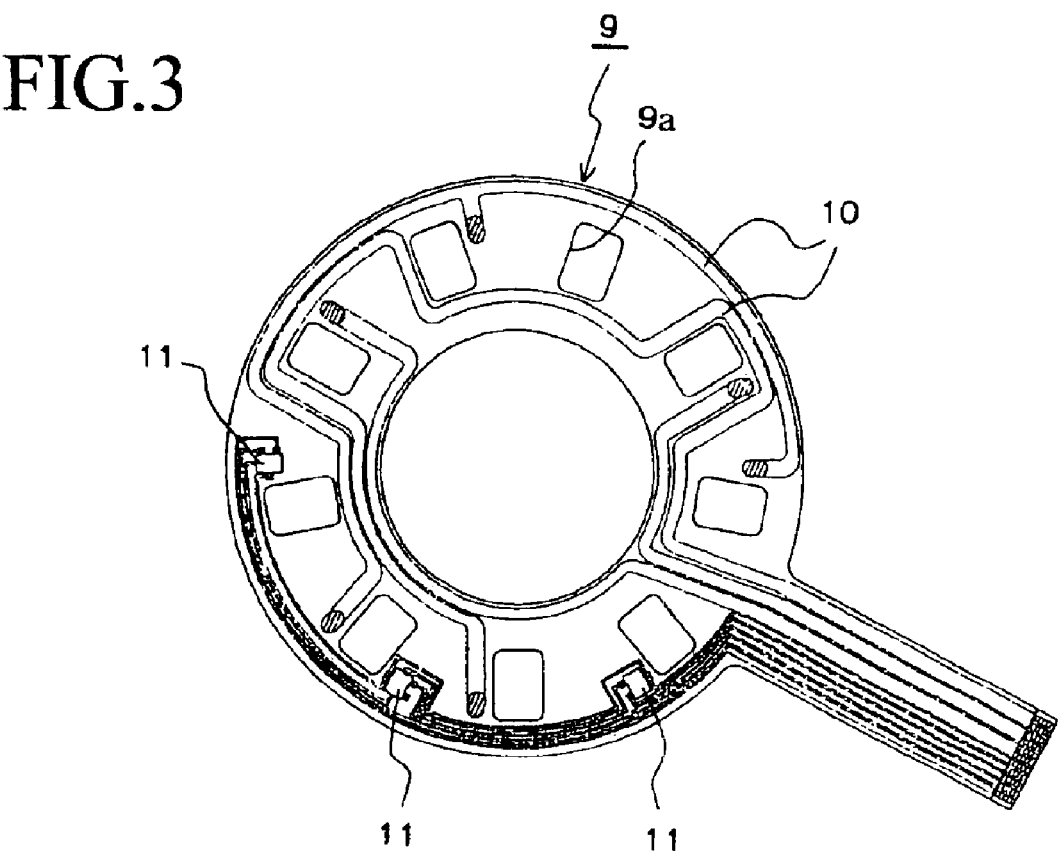
FIG. 3 is a plan view of a base plate on which a flexible circuit board is adhered.

Preferred embodiments of the present invention will now be described in detail with reference to the accompanying drawings.

FIG. 1A is a plan view of a motor of an embodiment of the present invention;

FIG. 1B is a side view thereof; FIG. 1C is a rear view thereof; FIG. 2A is a plan view of a main core; FIG. 2B is a plan view of a sub-core; and FIG. 3 is a plan view of a base plate on which a flexible circuit board is adhered.

Firstly, a stator of the motor will be explained. A base plate 1 acts as a bottom plate of a driving unit, which drives a recording medium, e.g., a cassette tape, a compact disk. In FIGS. 1A and 1B, a housing 3 is provided on the base plate 1. The housing 3 fixes a ring-shaped stator core 2 at a predetermined position. The stator core 2 is accommodated in and fixed to the housing 3 by caulking. A bearing holder 4, which is capable of rotatably supporting a rotary shaft of an outer rotor 20, is provided in a center of the base plate 1. A ball bearing (not shown), which rotatably supports the rotary shaft (not shown) of the outer rotor 20, is fixed in the bearing holder 4 by caulking.

In FIG. 1C, the base plate 1 has a plurality of through-holes 1a for ventilation. The through-holes 1a are circularly arranged with regular separations. The through-holes 1a introduce heat in the housing 3, which is generated by electric current passing through coils 8 formed on stator magnetic poles 2a, to outside. By rotating the outer rotor 20, the heat is introduced to outside of the housing 3 via the through-holes 1a. Since the through-holes 1a are formed with regular separations, strength of the base plate 1 can be maintained. Note that, in the present embodiment, the separation is equal to a width of the stator magnet pole 2a.

As shown in FIG. 3, a flexible circuit board 9 is adhered on the base plate 1. Cable patterns 10 for supplying electric power to the coils 8, Hall elements 11 for detecting a rotational angle of the outer rotor 20, etc. are provided to the flexible circuit board 9. Through-holes 9a, each of which corresponds to each through-hole 1a, are formed in the flexible circuit board 9. Since the through-holes 9a are also circularly arranged with regular separations, the flexible circuit board 9 has enough spaces for providing the cable patterns 10, the Hall elements 11, etc.

In FIGS. 2A and 2B, the stator core 2 comprises a main core 6a and a sub-core 6b. The main core 6a and the sub-core 6b are piled and integrated by caulking. The main core 6a constituted by piling a plurality of first core plates 5. In the present embodiment, the main core 6a has eight (8) first core plates 5. The first core plates 5 respectively have first extended pole sections 5a of the same number. The first extended pole sections 5a are radially outwardly extended from each of the first core plates 5. In the present embodiment, number of the first extended pole sections 5a of each first core plate 5 is 18.

On the other hand, the sub-core 6b is constituted by piling a plurality of second core plates 7. Note that, at least one second core plate 7 constitutes the sub-core 6b. In the present embodiment, the sub-core 6b has two (2) second core plates 7. The second core plates 7 respectively have second extended pole sections 7a of the same number. The second extended pole sections 7a are radially outwardly extended from each of the second core plates 7. Number of the second extended pole sections 7a of each second core plate 7 is less than that of the first extended pole sections 5a of each first core plate 5. In the present embodiment, the number of the second extended pole sections 7a of each second core plate 7 is nine (9). Note that, the sub-core 6b is provided on the lower side (the base plate 1 side) of the main core 6a.

In the present embodiment, the second extended pole sections 7a of each second core plate 7 is symmetrically arranged with respect to a center line passing one of the stator magnetic poles 2a of the stator core 2. With this structure, weight and magnetic poles of the stator can be well balanced. Note that, the core plates 5a and 5b may be integrated by an adhesive, welding, etc.

Number of the stator magnetic poles 2a of the stator 2 may be optionally determined. For example, in the case of a three-phase AC motor, the number of the first extended pole sections 5a of each first core plate 5 may be a multiple of six (6); the number of the second extended pole sections 7a of each second core plate 5 may be a half (½) of the number of the first extended pole sections 5a. In the present embodiment, the second extended pole sections 7a of the second core plate 7 corresponds to only the through-holes 1a of the base plate 1. Namely, there are formed nine (9) through-holes 1a in the base plate 1. With this structure, thickness of the coils 8 of the stator magnetic poles 2a can be absorbed in the thorough-holes 1a, so that the thin motor having the thick stator magnetic poles 2a can be realized. Therefore, many magnetic fluxes pass through the thick magnetic poles 2a, and they work to rotor magnets 21 of the outer rotor 20, so that forces of withdrawing and repulsing the outer rotor 20 can be greater. Namely, characteristics of torque can be improved.

The thickness of the coils 8 or the stator magnetic poles 2a corresponding to the through-holes 1a are different from those corresponding to no through-holes 1a. The differences can be adjusted by a coil winding device. In the present embodiment, only the stator magnetic poles 2a corresponding to the through-holes 1a are made thicker. The thickness of the stator magnetic poles 2a may be selectively adjusted, by piling the first and the second core plates 5 and 7, so as to avoid an interference with elements mounted on the flexible circuit board 9.

The outer rotor 20 is formed into a cup-shape. The rotary shaft (not shown) of the outer rotor 20 is rotatably supported by the bearing section 3 of the base plate 1. A plurality of the rotor magnets 21 are provided on an inner circumferential face of the outer rotor 20 and arranged in the circumferential direction to face the stator magnetic poles 2a.

In the motor of the present embodiment, the sub-core 6b constituted by the second core plates 7, whose number of the second extended pole sections 7a is less than that of the first extended pole sections 5a, is provided on the lower side (the base plate side) of the main core 6a and integrated therewith. Therefore, thickness of the stator magnetic poles 2a can be selectively made thicker by adjusting the number of the second extended pole sections 7a of the second core plates 7 and the number of the second core plates 2a. Many magnetic fluxes pass through the selected thick magnetic pole sections 2a, and they work to the rotor magnets 21 from front end faces of the magnetic pole sections 2a, so that forces of withdrawing and repulsing the outer rotor 20 can be greater. Namely, torque characteristics of the motor can be improved.

By forming the through-holes 1a for ventilation in the circumferential direction with regular separations, strength of the base plate 1 can be maintained. Further, the flexible circuit board 9, which is adhered on the base plate 1, can have enough spaces for forming the cable patterns 10 and mounting the Hall elements 11, etc.

Especially, the second extended pole sections 7a of the second core plates 7 corresponds to the through-holes 1a of the base plate 1, so that the thickness of the coils 8 or the stator core 2 can be absorbed in the thorough-holes 1a. Therefore, the thin motor having the thick stator magnetic poles 2a can be realized without an interference between the coils 8 and the base plate 1. By employing the thick stator magnetic poles 2a, the torque characteristics of the motor can be improved.

Since the second extended pole sections 7a of each second core plate 7 are symmetrically arranged with respect to the center line passing one of the stator magnetic poles 2a of the stator core 2, weight and the magnetic poles 2a of the stator can be well balanced.

The present invention is not limited to the above described embodiment. For example, the number of the first core plates 5 of the stator core 2, the number of the second extended pole sections 7a of the second core plate 7, the number of the second core plates 7, etc. may be optionally designed according to a use of the motor, etc.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A motor, comprising:

a stator including a base plate, a circuit board provided on the base plate, and a ring-shaped stator core piled on the circuit board, stator magnetic poles extending radially outwardly from the stator core, and coils respectively formed on the stator magnetic poles; and an outer rotor being rotatably provided on the base plate and having rotor magnets, which face the stator magnetic poles, wherein the base plate has a plurality of through-holes for ventilation, the through-holes being arranged in a circumferential direction with regular separation, the stator core including a plurality of piled first core plates and at least one second core plate, the piled first core plates including a plurality of first extended pole sections, the second core plate being provided between the piled first core plates and the base plate, and the second core plate including a plurality of second extended pole sections, the second extended pole sections corresponding respectively to the through-holes, wherein the plurality of the second extended pole sections is less than the plurality of the first extended pole sections.

2. The motor according to claim 1, wherein the second extended pole sections of the second core plate are symmetrically arranged with respect to a center line passing one of the stator magnetic poles of the stator core.

* * * * *